UNITED STATES PATENT OFFICE.

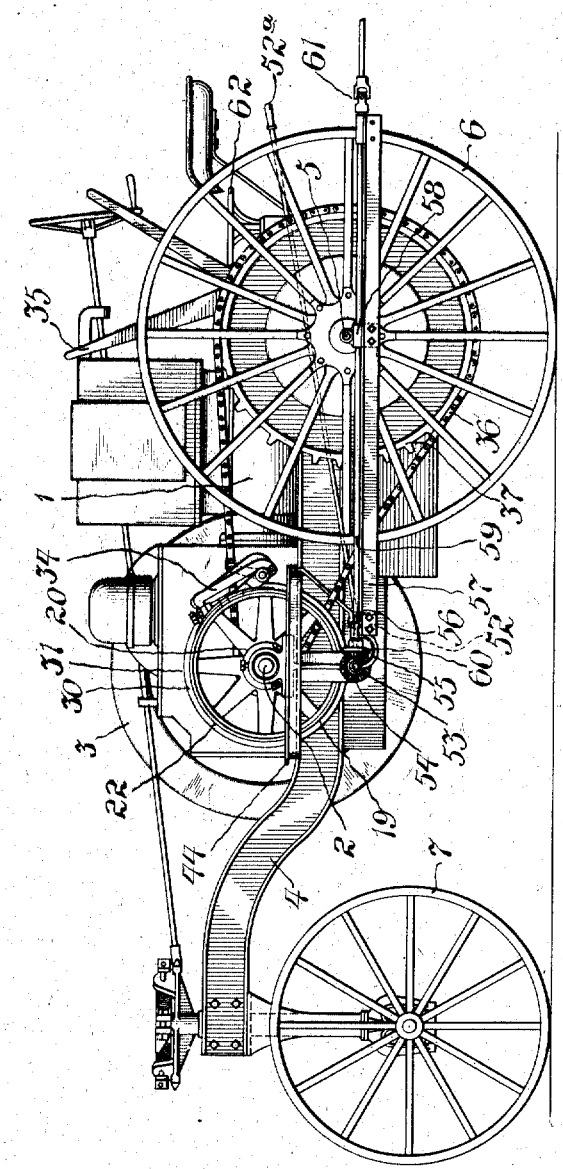

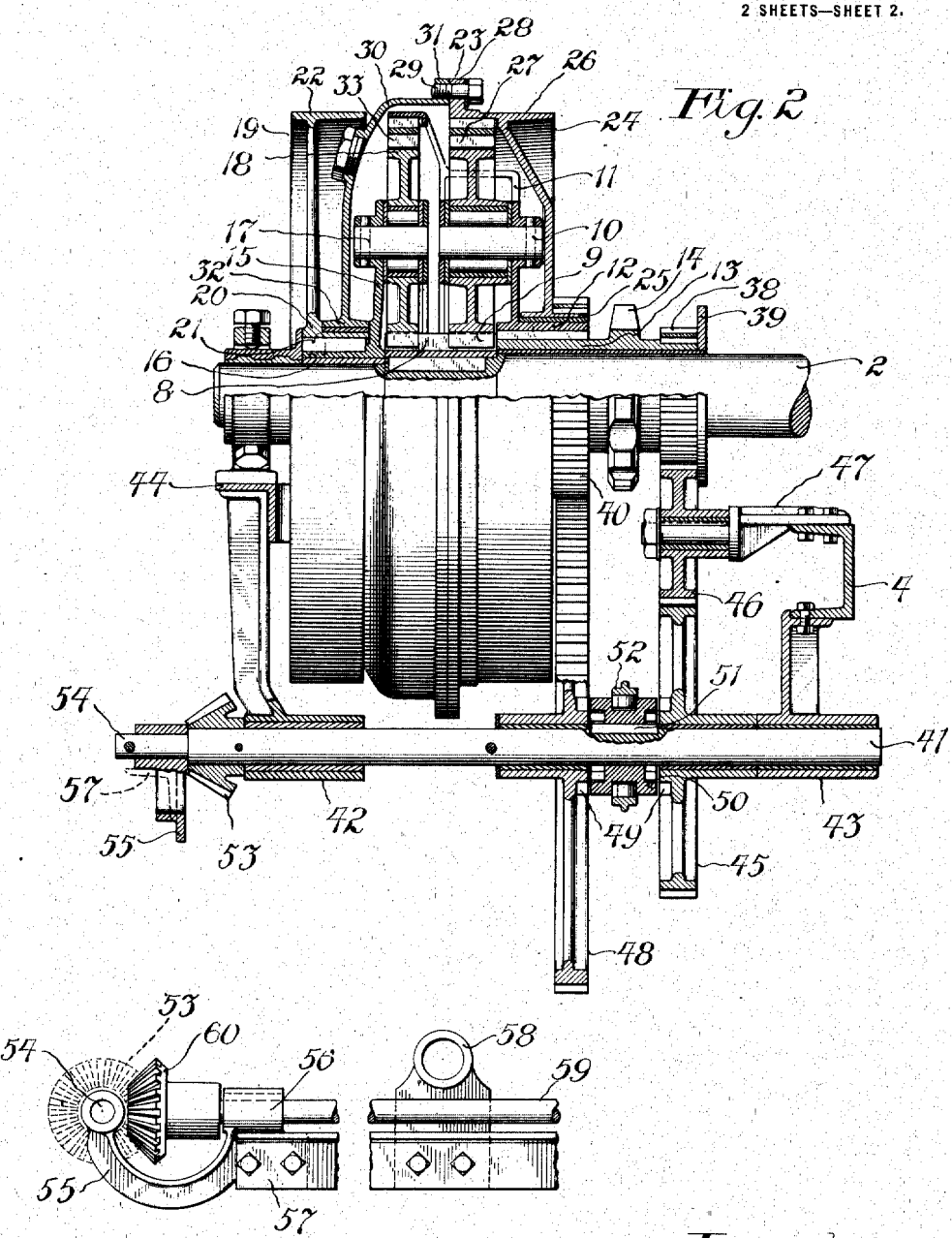

EDWARD W. BURGESS, OF CHICAGO, ILLINOIS, ASSIGNOR, BY MESNE ASSIGNMENTS, TO INTERNATIONAL HARVESTER COMPANY, A CORPORATION OF NEW JERSEY.

POWER-TRANSMISSION GEARING.

1,301,811.      Specification of Letters Patent.      Patented Apr. 29, 1919.

Application filed September 22, 1915. Serial No. 52,098.

*To all whom it may concern:*

Be it known that I, EDWARD W. BURGESS, a citizen of the United States, residing at Chicago, in the county of Cook and State of Illinois, have invented certain new and useful Improvements in Power-Transmission Gearing, of which the following is a full, clear, and exact specification.

My invention relates to power transmission gearing for tractors and for use in propelling harvesters, mowers, manure spreaders and other tractive driven implements, and transmitting motion to their operative parts from the tractor motor, whether the tractor be moving or stationary, the object of the invention being to provide a gear mechanism adapted for substantially universal use in transmitting motion to the various farm implements as indicated, or others, as circumstances require, and to widen the range of usefulness of the tractor and make it an available power for many purposes.

This object is attained by means of mechanism illustrated in the accompanying drawings, in which—

Figure 1 is a side elevation of a tractor having my invention embodied in its construction;

Fig. 2 is a vertical cross section on an enlarged scale of part of the power transmitting gearing; and Fig. 3 is a detached detail of the tractor on an enlarged scale, as shown in Fig. 1.

Referring to the drawings, wherein the same reference numerals designate like parts throughout the several views, the internal combustion engine, including a cylinder 1, crank shaft 2, and fly wheel 3, is mounted upon a truck having frame members 4 upon its opposite sides that are carried at their rear ends upon an axle 5 having traction wheels 6 at its opposite ends, and 7 represents steering wheels at the front end of the truck frame. Power is transmitted from the engine shaft to the traction wheels by means including a pinion 8 secured to the shaft and meshing with an orbital gear 9 journaled upon a stud 10 secured to one arm 11 of a three-armed spider having its arms radiating from a hub 12, whereby it is secured to one end of a sleeve 13 that is journaled upon the crank shaft 2 at one end of the pinion 8, and 14 represents a driving sprocket integral with the body of the sleeve. 15 represents a disk-like carrier having a hub 16 whereby it is journaled upon the crank shaft at the opposite end of the pinion 8. 17 represents one of a series of preferably three studs 60 secured to the carrier, and 18 a rotatable gear journaled upon the stud and meshing with the pinion 8. 19 represents a wheel having a hub 20 whereby it is secured to the hub 16 by means of a key 21 and a traction rim 22. 23 represents a two-part casing having one part 24 provided with a hub 25 whereby it is journaled upon the hub 12, a friction rim 26 and a gear ring 27 secured to the rim and meshing with the 70 gear 9, and a peripheral flange 28 whereby the part of the casing is secured by means of bolts 29 to a second part 30 having a corresponding peripheral flange 31 and a hub member 32 whereby it is journaled 75 upon the hub 20 of the wheel 19. A gear ring 33 is carried by the arms 11 and meshes with the gears 18 mounted upon the carrier 15. 34 represents a friction band mechanism adapted to operatively engage with 80 the friction rims 22 and 26 and controlled by the operator by means of hand levers 35. Motion is transmitted to the traction wheels by means of a chain 36 engaging the driving sprocket 14 and a driven sprocket 37 85 carried by the tractor axle. The power transmission mechanism as described above is a common form of direct and reverse planetary gear.

My invention comprises means for transmitting motion from such mechanism to a 90 countershaft journaled in bearings carried by the truck frame and disposed parallel with the engine shaft, such means being operative whether the tractor is moving or 95 stationary, and includes a gear ring 38 secured to the inner end of the sprocket carrying sleeve 13, a collar 39 being mounted on the sleeve between the gear ring and the engine frame, a gear ring 40 secured to the 100 hub 25 of the casing part 24, a countershaft 41 having its opposite ends journaled in outside and inside bearing boxes 42 and 43, respectively, that are secured to a supplemental frame member 44 and one of the 105 truck frame members 4, respectively, a gear wheel 45 journaled upon the countershaft adjacent the bearing member 43, an intermediate pinion 46 journaled upon a bracket member 47 secured to the truck frame 4 and 110 meshing with a gear ring 38 and gear wheel 45, and a gear wheel 48 journaled upon the countershaft and meshing with the gear ring secured to the part 24 of the casing 23. The opposing ends of the hubs of the gear wheels 45 and 48 are provided with clutch teeth 49, and 50 represents a clutch sleeve secured to the countershaft by means of a spline 51 and having clutch teeth at its opposite ends that may selectively engage with the clutch teeth upon the hubs of the gear wheels 45 and 48. 52 represents a clutch shipping fork in engagement with the sleeve that may be controlled by the operator in any proper manner, as by a control member 52ª. 53 represents a beveled pinion secured to the countershaft adjacent the opposite end of the bearing box 42. A reduced part 54 of the countershaft extends beyond the pinion, and pivotally mounted thereon is an arm 55 integral with a bearing box 56 secured to the front end of a bar 57, the rear end of the bar being supported by a bracket member 58 journaled upon an extension of the tractor axle. A longitudinally disposed shaft 59 is journaled in bearings carried by the bar and secured to its front end is a pinion 60 that meshes with the pinion 53 and its rear end carries coupling members 61 whereby it may be operatively connected with other implements, as desired. 62 represents a brake operating wheel forming part of the tractor brake mechanism whereby the tractor may be held stationary.

In operation, with the engine running idle, the crank shaft transmits motion through the pinion 8 to the orbital gear wheels 9 and 18, then to the casing 23 through the orbital gears 9 and the gear ring 27, and through the gear ring 33 and gear wheels 18 to the carrier 15 and wheel 19. When the casing is held against rotation by means of the friction band mechanism, the orbital gear wheels 9 engaging with the gear ring 27, and arms 11 will be carried around the axis of the engine crank shaft, thereby rotating the sleeve 13 in a forward direction and the gear wheel 45 on the countershaft through the intermediate pinion 46 and gear ring 38 in the same direction, and the tractor moves forward driven by the sprocket chain. If the friction band mechanism is caused to hold the wheel 19 against rotation, the orbital gear wheels 18 will turn the gear ring 33 about the axis of the engine shaft thereby rotating the gear supporting arms 11 and the sleeve 13 in a direction to reverse the movement of the tractor wheels. When the tractor is held stationary by means of the brake mechanism, the sprocket wheel 14 holds the sleeve 13 and arms 11 against rotation and the orbital gears 9 through the gear ring 27 will impart rotative movement to the casing 23 about the axis of the crank shaft, and the gear 40 rotates the gear wheel 48 while the tractor is held stationary and the countershaft becomes available for transmitting a relatively slow speed to any stationary machine as desired.

Having shown and described one embodiment of my invention, I do not wish that it be confined to the specific details of the tractor as illustrated, it being understood that changes may be made in the form and proportion of its parts without departing from the spirit of the invention.

What I claim as my invention, and desire to secure by Letters Patent, is:

1. Power transmission gearing including, in combination, a driving shaft, a pinion secured to said shaft, a gear sleeve journaled upon said shaft, a spider having its hub secured to said sleeve, orbital gears journaled upon said spider and driven by said pinion, a rotatable element having internal gear teeth meshing with said orbital gears and journaled upon the hub of said spider, a countershaft, a gear connection between said countershaft and said gear sleeve, and means for holding said rotatable element against rotation.

2. Power transmission gearing including, in combination, a driving shaft, a pinion secured to said shaft, a gear sleeve journaled upon said shaft, a spider having its hub secured to said sleeve, orbital gears journaled upon said spider and driven by said pinion, a rotatable element having internal gear teeth meshing with said orbital gears and having a hub journaled upon the hub of said spider, a gear ring secured to the hub of said rotatable element, means for securing said gear sleeve against rotation, a countershaft, and a gear connection between said shaft and said gear ring.

3. Power transmission gearing including, in combination, a driving shaft, a pinion secured to said shaft, a gear sleeve journaled upon said shaft, a spider having its hub secured to said sleeve, orbital gears journaled upon said spider and driven by said pinion, a casing rotatable about the axis of said shaft and provided with an internal gear ring meshing with said orbital gears, means whereby said casing or said gear sleeve may be held against rotation, a gear ring secured to said casing, a countershaft, and gear connections between said countershaft, said gear ring and said gear sleeve.

4. Power transmission gearing including, in combination, a driving shaft, a pinion secured to said shaft, a gear sleeve journaled upon said shaft, a spider having its hub secured to said sleeve, orbital gears journaled upon said spider and driven by said pinion, a casing rotatable about the axis of said shaft and provided with an internal gear ring meshing with said orbital gears, means whereby said casing or said gear sleeve may be held against rotation, a gear ring secured to said casing, a countershaft, independent gear wheels journaled upon said countershaft and driven respectively by said gear ring and said gear sleeve, a clutch member splined upon said countershaft and adapted to selectively engage either of said independent gear wheels.

5. Power transmission gearing for tractors including a truck frame mounted upon traction carrying wheels, an engine mounted upon said frame and including an engine shaft, tractor propelling elements operatively connected with said shaft, a countershaft operatively connected with said propelling elements, and a second countershaft detachably connected with an adapted to swing about the axis of said first countershaft and extended to the rear of the tractor.

6. Power transmission gearing for tractors including a truck frame mounted upon traction and carrying wheels, a traction wheel axle, an engine mounted upon said frame and including an engine shaft, tractor propelling elements operatively connected with said engine shaft, a countershaft journaled upon said truck frame and operatively connected with said propelling elements, a bar having its rear end supported by one end of said axle and its front end detachably connected with said countershaft, and a shaft journaled in bearings carried by said bar and driven from said countershaft.

7. Power transmission gearing for motor vehicles including, in combination, a power shaft, means associated therewith for driving a motor vehicle in forward and reverse directions comprising relatively movable elements, an independent shaft, and means whereby said independent shaft may take motion from said power shaft through one element when the motor vehicle is in motion and through another element when said motor vehicle is stationary.

8. Power transmission gearing for motor vehicles including, in combination, a power shaft, means associated therewith for driving a motor vehicle in forward and reverse directions comprising relatively movable elements, an independent shaft, means whereby said independent shaft may take motion from said power shaft through the connection with one element when the motor vehicle is in motion and through the connection with another element when said motor vehicle is stationary, and means for controlling the connections.

9. A vehicle having an engine for propelling the same, a transmission having relatively movable elements, and an auxiliary driving shaft adapted to receive power through one of said elements of the transmission when said vehicle is being propelled and through another when the vehicle is stationary.

10. A vehicle having an engine for propelling the same, a transmission having relatively movable elements, and an auxiliary driving shaft adapted to receive power, through one of said elements of the transmission when said vehicle is being propelled and through another when the vehicle is stationary, and means for controlling the connections.

11. Power transmission gearing for motor vehicles including, in combination, a power shaft, means associated therewith including brake drums and brakes thereon for driving a vehicle in forward and reverse directions, an independent shaft, and means associated with said brake drums whereby said independent shaft may take motion or not from said brake drums whether the propelling vehicle wheels are in motion or stationary.

12. Power transmission gearing for motor vehicles including, in combination, a power shaft, means associated therewith for driving a vehicle in forward and reverse directions including relatively movable members, means by which each may be held stationary to drive the other, an independent shaft, and means for driving said shaft from either of said members.

In testimony whereof I affix my signature.

EDWARD W. BURGESS.

Copies of this patent may be obtained for five cents each, by addressing the "Commissioner of Patents, Washington, D. C."